(12) United States Patent
Muhlhoff et al.

(10) Patent No.: US 10,875,362 B2
(45) Date of Patent: Dec. 29, 2020

(54) TIRE TREAD COMPRISING A BLOCK HAVING A PLURALITY OF CUTOUTS

(71) Applicant: COMPAGNIE GENERALE DES ETABLISSEMENTS MICHELIN, Clermont-Ferrand (FR)

(72) Inventors: Olivier Muhlhoff, Clermont-Ferrand (FR); Benoit Durand-Gasselin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 88 days.

(21) Appl. No.: 15/571,897

(22) PCT Filed: May 4, 2016

(86) PCT No.: PCT/FR2016/051057
§ 371 (c)(1),
(2) Date: Nov. 6, 2017

(87) PCT Pub. No.: WO2016/177975
PCT Pub. Date: Nov. 10, 2016

(65) Prior Publication Data
US 2018/0134094 A1  May 17, 2018

(30) Foreign Application Priority Data
May 7, 2015 (FR) ...................................... 15 54094

(51) Int. Cl.
*B60C 11/12* (2006.01)
*B60C 11/03* (2006.01)

(52) U.S. Cl.
CPC ...... *B60C 11/1236* (2013.01); *B60C 11/0304* (2013.01); *B60C 11/0306* (2013.01);
(Continued)

(58) Field of Classification Search
CPC ........................... B60C 11/12; B60C 11/1236
See application file for complete search history.

(56) References Cited

U.S. PATENT DOCUMENTS 4,736,783 A * 4/1988 Motomura ............ B60C 9/2006
152/209.22
5,373,882 A 12/1994 Nakagawa
(Continued)

FOREIGN PATENT DOCUMENTS

CN 1397440 2/2003
EP 0 324 605 1/1989
(Continued)

*Primary Examiner* — Timothy Kennedy
*Assistant Examiner* — Alexander A Wang
(74) *Attorney, Agent, or Firm* — Cozen O'Connor

(57) ABSTRACT

Tire tread comprising elongate block (3) of rubbery material extending in a circumferential direction (X) when the tread (1) is mounted on the tire. The elongate block (3) comprises a ground contact surface (5) delimited by first and second lateral walls (7,9), with a plurality of cutouts (11a, 11b) that open onto it. The cutouts (11a, 11b) extend in an oblique direction from the first lateral wall (7) in the direction of the second lateral wall (9) as far as cutout ends (13a, 13b). For at least one cutout (11a) that opens onto the first lateral wall (7), its end (13a) does not open onto the second lateral wall (9), and when this cutout (11a) reaches its cutout end (13a), another cutout (11b) starts out from the first lateral wall (7), at a same circumferential level (N) on the elongate block (3). The cutouts (11a, 11b) are sipes.

10 Claims, 3 Drawing Sheets

(52) U.S. Cl.
CPC .......... *B60C 11/12* (2013.01); *B60C 11/1204* (2013.01); *B60C 2011/0358* (2013.01); *B60C 2011/0372* (2013.01); *B60C 2011/1209* (2013.01)

(56) References Cited

U.S. PATENT DOCUMENTS

| | | | |
|---|---|---|---|
| 2003/0029537 A1* | 2/2003 | Iwamura | B60C 11/12 152/209.18 |
| 2003/0111149 A1 | 6/2003 | Caretta et al. | |
| 2006/0005905 A1 | 1/2006 | Croissant et al. | |
| 2016/0303919 A1* | 10/2016 | Yamaoka | B60C 11/0332 |

FOREIGN PATENT DOCUMENTS

| | | |
|---|---|---|
| EP | 0 561 531 | 9/1993 |
| EP | 1277599 | 1/2003 |
| EP | 1 616 719 | 1/2016 |
| WO | WO 01/39572 | 6/2001 |
| WO | WO 2012/032144 | 3/2012 |
| WO | WO 2016/056168 | 4/2016 |

\* cited by examiner

TIRE TREAD COMPRISING A BLOCK HAVING A PLURALITY OF CUTOUTS

RELATED APPLICATIONS

This is a U.S. National Phase Application under 35 USC 371 of International Application PCT/FR2016/051057 filed on May 4, 2016.

This application claims the priority of French application no. 15/54094 filed May 7, 2015, the entire content of which is hereby incorporated by reference.

FIELD OF THE INVENTION

The present invention relates to a tread for a motor vehicle tire provided with means for substantially reducing running noise.

BACKGROUND OF THE INVENTION

Usually, passenger vehicle tires are provided with a carcass reinforcement which nowadays is radial in the great majority of cases; in this configuration, the reinforcers of the carcass reinforcement are disposed so as to make an angle greater than or equal to 80 degrees and less than 100 degrees with a circumferential direction.

Moreover, tires are provided with a crown reinforcement comprising a plurality of reinforcers embedded in an elastomer-based material. This crown reinforcement is covered radially on the outside by a tread made of rubbery material, this tread having a surface, referred to as the tread surface, intended to be in contact with the road during running.

In order to ensure a level of safety that is essential when driving in the wet, notably, it is a known procedure to provide the tread with a plurality of longitudinal grooves of circumferential overall orientation.

One drawback with the presence of longitudinal grooves is the generation of vibrations in the air flowing through these grooves, notably in the region of contact with the road. These vibrations are the source of resonances that generate running noise.

The document EP0324605 discloses a tread comprising a plurality of blocks aligned in a circumferential direction. In that document, the blocks are inclined at a particular angle in order to reduce the generation of running noise.

The document WO2012032144 discloses a tread comprising a plurality of elongate blocks extending in the circumferential direction. Each elongate block comprises a plurality of sipes of transverse overall orientation in order to improve the grip of the tread, notably when braking on wet ground.

There is a need to limit the generation of noise by a tread comprising at least one elongate block extending in a circumferential direction.

Definitions

A "tire" means all types of resilient tread, whether or not it is subjected to an internal pressure.

The "tread" of a tire means a quantity of rubbery material delimited by lateral surfaces and by two main surfaces, one of which is intended to come into contact with a road surface when the tire is being driven on.

The "tread surface" means the set of points of the tread that are in contact with the road surface when the tire, inflated to its reference pressure, is driven on this road surface. The reference inflation pressure is defined under the use conditions of the tire as defined notably by the E.T.R.T.O. ("European Tire and Rim Technical Organisation") standard. The width C of the tread surface can notably be defined by the ETRTO standard such that $C=(1.075-0.005ar)*S^{1.001}$, where ar is the nominal aspect ratio and s is the theoretical section width on a measuring rim.

A "block" on a tread means a raised element delimited by grooves and comprising lateral walls and a contact face, the latter being intended to come into contact with the ground during running.

An "elongate block" means a block having a width and a length around the circumference of the tire, this length being much greater than the width.

A "rib" means an elongate block which extends around the entire circumference of the tire.

A "groove" means a cutout in the tread delimiting walls of material, the width of this cutout being such that the walls associated with this cutout cannot come into contact with one another under normal running conditions. The width of a groove is greater than 2 millimetres.

A "sipe" means a cutout in the tread delimiting walls of material, the width of this cutout being suitable for allowing the walls of the sipe to come at least partially into contact as they pass through the contact patch in which the tire is in contact with the ground. The width of a sipe is less than or equal to 2 millimetres.

A "transverse direction" or "axial direction" means a direction parallel to the axis of rotation of the tire.

A "circumferential direction" means a direction tangential to any circle centred on the axis of rotation. This direction is perpendicular to the axial direction.

An "oblique direction" means a direction that has an axial component and a circumferential component, neither of which is zero.

A "circumferential level" means a set of points that form a straight line, this straight line being perpendicular to the circumferential direction.

A "median plane" means a plane which is perpendicular to the axis of rotation of the tire and passes through the middle of the tread.

SUMMARY OF THE INVENTION

One aspect of the invention relates to a tire tread comprising at least one elongate block of rubbery material of width W and length L, where L>>W, this elongate block extending in a circumferential direction when the tread is mounted on the tire. The elongate block comprises a contact surface intended to come into contact with the ground and a first lateral wall and a second lateral wall delimiting this contact surface. The elongate block also comprises a plurality of cutouts that open onto the contact surface of the elongate block. The cutouts extend in an oblique direction from the first lateral wall in the direction of the second lateral wall as far as cutout ends. For at least one cutout that opens onto the first lateral wall, its end does not open onto the second lateral wall, and when this cutout reaches its cutout end, another cutout starts out from the first lateral wall, at a same circumferential level on the elongate block. The cutouts are sipes.

An embodiment of the invention therefore proposes ensuring continuity in the organization of the cutouts in the elongate block. Specifically, when a cutout reaches one of its ends, another cutout starts out at the same circumferential level. This limits the variation in the void ratio in the circumferential direction in the elongate block and the acoustic performance of the tire is improved as a result.

In one variant embodiment, the other cutout opens onto the second lateral wall.

The cutouts opening onto the second lateral wall form sub-blocks in the elongate block. Each sub-block thus comprises a cutout which does not open onto this second lateral wall. This thus promotes the flattening of the elongate block.

In another variant embodiment, the cutouts have curved shapes at the contact surface of the elongate block.

By using cutouts with a curved shape, the overall appearance of the tread is made more attractive while at the same time the noise generated by the tire is limited.

In one variant embodiment, the cutouts comprise at least two parts with different inclinations.

By using complex cutouts comprising at least two parts with different inclinations, it is possible to improve the grip on wet ground both when cornering and when driving in a straight line.

In another variant embodiment, two adjacent cutouts in the elongate block have different inclinations and/or different shapes and/or different lengths.

By combining different cutouts, the scrambling of the sound signal emitted by the elongate block during running is improved.

In another variant embodiment, the cutouts are sipes.

This improves the grip of the tread on wet ground while preserving a degree of overall stiffness of the elongate block.

In another variant embodiment, the cutouts are grooves.

This improves the flow of water out of the tread when the tire is running on wet ground.

BRIEF DESCRIPTION OF THE DRAWINGS

Other features and advantages of the invention will become apparent from the following description, given by way of non-limiting example, with reference to the attached drawings in which.

In the following description, elements which are substantially identical or similar will be denoted by identical references.

DETAILED DESCRIPTION OF THE DRAWINGS

Figure 1:
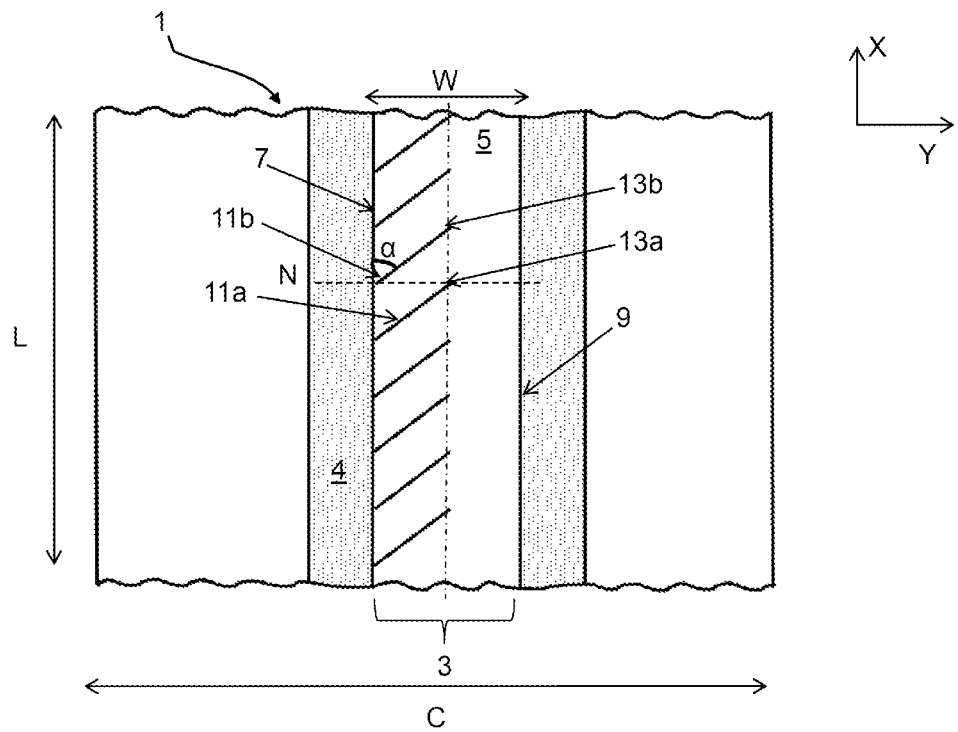
FIG. 1 schematically shows a partial view of a tread according to a first embodiment of the invention.

FIG. 1 shows a partial view of a tread 1 of a tire according to a first embodiment of the invention.

The tread 1 comprises at least one elongate block 3 of rubbery material. The elongate block 3 is delimited here by two grooves 4 which have been shaded grey in FIG. 1 in order to make the invention easier to understand. The elongate block 3 has a width W and a length L, this length L being much greater than the width W. Much greater means that the length L is at least equal to 5 times the width W. In this way, when the tread 1 is mounted on a tire, the elongate block 3 looks like a strip extending in a circumferential direction X. This strip may extend around the entire circumference of the tire and the elongate block then corresponds to a rib. Alternatively, this strip extends around only part of this circumference.

The elongate block 3 comprises a contact surface 5 intended to come into contact with the ground and a first lateral wall 7 and a second lateral wall 9 delimiting this contact surface 5. The elongate block 3 also comprises a plurality of oblique cutouts 11a, 11b that open onto the first lateral wall 7 and extend as far as cutout ends 13a, 13b which do not open out onto lateral walls. In this case, the ends 13a, 13b are present on a median plane of the tread.

The cutouts 11a, 11b are distributed over the contact surface 5 such that when the cutout 11a reaches its cutout end 13a, another cutout 11b starts out from the first lateral wall 7, at a same circumferential level N on the elongate block 3. Thus, when the cutouts 11a, 11b are projected in the circumferential direction X, there is no overlapping of cutouts in this circumferential direction X. This limits the variation in the void ratio in the elongate block 3 in this circumferential direction. It will also be noted that, since the cutouts 11a, 11b do not pass through the elongate block, good overall stiffness of the elongate block 3 is ensured.

The cutouts 11a, 11b opens onto the wall 7 to the circumferential direction X in the elongate block at an angle $\alpha$.

In one non-limiting embodiment, the angle $\alpha$ is greater than or equal to 55°.

Figure 2:
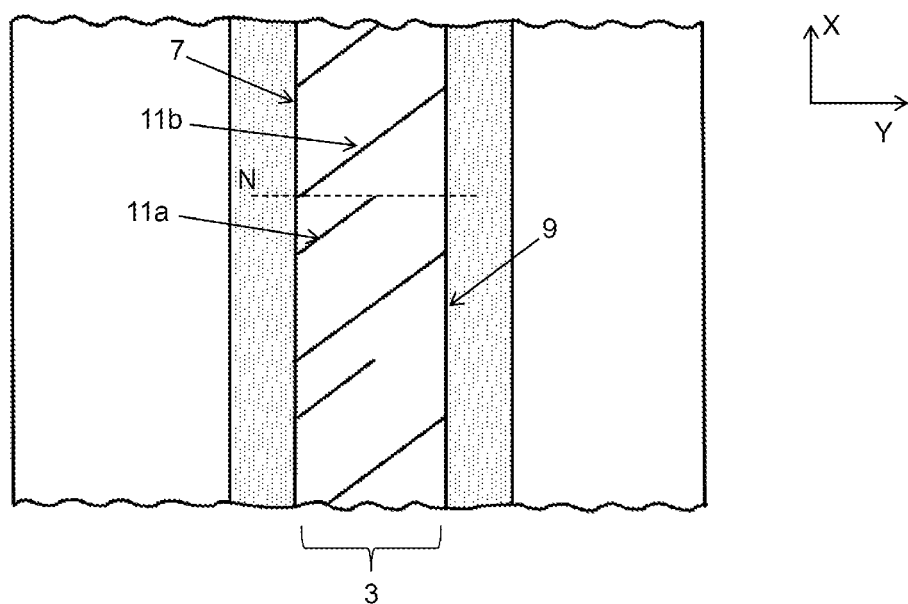
FIG. 2 schematically shows a second variant embodiment of the invention.

FIG. 2 depicts a variant embodiment, in which the cutout 11b opens onto the second lateral wall 9 such that the elongate block 3 is formed by a plurality of sub-blocks.

Figure 3:
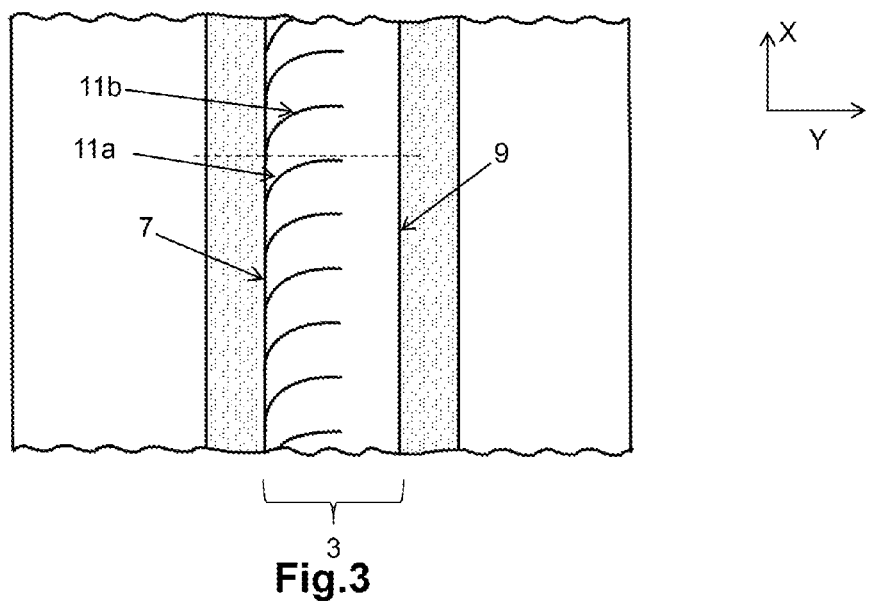
FIG. 3 schematically shows a third variant embodiment of the invention.
Figure 4:
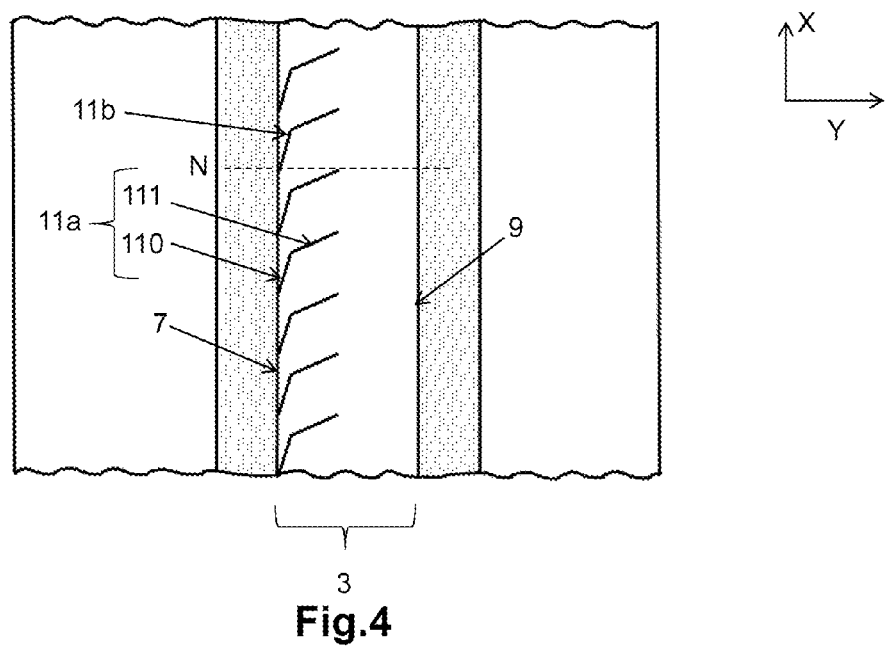
FIG. 4 schematically shows a fourth variant embodiment of the invention.

FIGS. 3 and 4 depict variant embodiments. In FIG. 3, the cutouts 11a, 11b have curved shapes on the surface of the elongate block 3. In FIG. 4, the cutouts 11a, 11b are complex and comprise at least two parts with different inclinations.

In another non-limiting embodiment that is illustrated in FIG. 4, the cutouts 11a comprise only a first part 110 and a second part 111. The first part 110 of the cutout 11a starts out from one of the lateral walls 7 of the elongate block, and the second part 111 continues the first part 110 in the direction of the other lateral wall 9. The first part 110 and the second part 111 have two different inclination angles.

Figure 6:
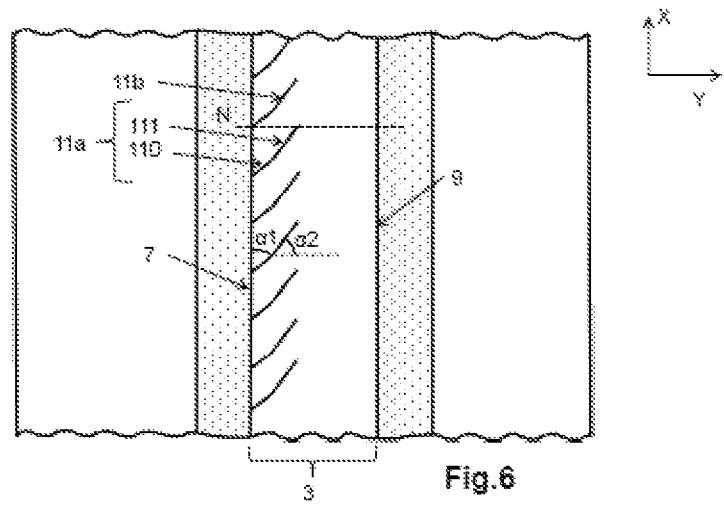
FIG. 6 schematically shows a sixth variant embodiment of the invention.

In one non-limiting embodiment that is illustrated in FIG. 6, the first part 110 of the cutout 11a makes a first angle $\alpha 1$ with the elongate block. This first angle $\alpha 1$ is greater than or equal to 55°. This avoids the creation of a thin and fragile area of rubber between the cutout 11a and the lateral wall 7 of the elongate block.

In another embodiment, the second part 111 makes a second angle $\alpha 2$ with the transverse direction Y. This second angle $\alpha 2$ is greater than or equal to 55°.

Figure 5:
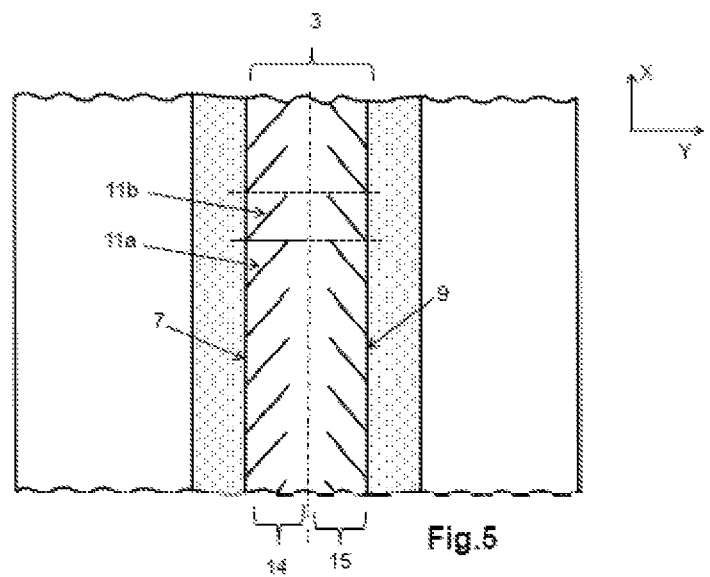
FIG. 5 schematically shows a fifth variant embodiment of the invention.

FIG. 5 depicts a variant embodiment in which the elongate block 3 comprises a second set 15 of cutouts. The cutouts of the second set of cutouts are symmetrical with the cutouts 11a, 11b of the first set of cutouts 14, such that the ends of the cutouts are aligned at the levels N and N', with respect to one another. The void ratio on the surface of the elongate block is thus generally constant in the circumferential direction.

The invention is not limited to the examples described and shown and various modifications can be made thereto without departing from its scope.

Thus, combinations of sipes having different inclinations and/or different shapes and/or different lengths are possible. The noticeable features of the tread pattern noise spectrum are decreased. The scrambling of the sound signal emitted by the tread pattern of the tire is thus improved.

In another embodiment, it is possible, for example, to provide for the cutouts to be chamfered at the contact surface of the elongate block.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire tread comprising at least one elongate block of material comprising rubber, each said elongate block being of width W and length L, where L>>W, each said elongate block extending in a circumferential direction when the tread is mounted on a tire, each said elongate block comprising a contact surface adapted to come into contact with the ground and a first lateral wall and a second lateral wall delimiting this contact surface, each said elongate block comprising:
 a first plurality of first oblique cutouts that open onto the first lateral wall, each of the first oblique cutouts extending in a direction having a non-zero axial component over an entirety of the first oblique cutout from the first lateral wall toward the second lateral wall as far as a first cutout end; and
 a second plurality of second oblique cutouts that open onto the first lateral wall, each of the second oblique cutouts extending in a direction having a non-zero axial component over an entirety of the second oblique cutout from the first lateral wall in a direction of the second lateral wall as far as a second cutout end,
 wherein the first oblique cutouts of the first plurality and the second oblique cutouts of the second plurality alternately follow one another longitudinally over the contact surface of each said elongate block, and
 wherein for at least two individual cutouts selected from the group consisting of all of said first and second oblique cutouts, their respective cutout ends do not open onto the second lateral wall, and wherein when each one of said selected at least two individual cutout cutouts reaches its cutout end at a first circumferential level (N) on any elongate block, a circumferentially adjacent first or second cutout starts out from the first lateral wall, at the same first circumferential level (N) on that same elongate block, and wherein the first and second oblique cutouts are sipes.

2. The tread according to claim 1, wherein each of the first and second oblique cutouts form an angle $\alpha$ with the circumferential direction, said angle $\alpha$ being greater than or equal to 55°.

3. The tread according to claim 1, wherein all of the oblique cutouts from said second plurality of oblique cutouts open onto the second lateral wall.

4. The tread according to claim 1, wherein each of the first and second oblique cutouts have curved shapes at the contact surface.

5. The tread according to claim 1, wherein each of the first and second oblique cutouts comprise at least two parts with different inclinations.

6. The tread according to claim 1, wherein each of the first and second oblique cutouts comprise a first straight line part and a second straight line part, the first straight line part starting out from one selected from the group of the first lateral wall and the second lateral wall.

7. The tread according to claim 6, wherein the first straight line part of any oblique cutout makes a first angle $\alpha 1$ with the circumferential direction, said first angle $\alpha 1$ being greater than or equal to 55°.

8. The tread according to claim 7, wherein the second straight line part of any oblique cutout makes a second angle $\alpha 2$ with a transverse direction, said second angle $\alpha 2$ being greater than or equal to 55°.

9. The tread according to claim 1, wherein two adjacent oblique cutouts in the at least one elongate block have different inclinations and/or different shapes and/or different lengths.

10. The tread according to claim 1, wherein the at least one elongate block is a rib.

* * * * *